US012288436B2

(12) United States Patent
Watanabe et al.

(10) Patent No.: US 12,288,436 B2
(45) Date of Patent: Apr. 29, 2025

(54) PAPER SHEET HANDLING APPARATUS

(71) Applicant: FUJITSU FRONTECH LIMITED, Tokyo (JP)

(72) Inventors: Takashi Watanabe, Inagi (JP); Hiroshi Yanagida, Inagi (JP); Koichi Hosoyama, Inagi (JP); Yasushi Gotoh, Inagi (JP)

(73) Assignee: FUJITSU FRONTECH LIMITED, Tokyo (JP)

( * ) Notice: Subject to any disclaimer, the term of this patent is extended or adjusted under 35 U.S.C. 154(b) by 454 days.

(21) Appl. No.: 17/660,670

(22) Filed: Apr. 26, 2022

(65) Prior Publication Data

US 2022/0254214 A1 Aug. 11, 2022

Related U.S. Application Data

(63) Continuation of application No. PCT/JP2019/042712, filed on Oct. 31, 2019.

(51) Int. Cl.
*B65H 29/00* (2006.01)
*G07D 11/13* (2019.01)

(52) U.S. Cl.
CPC ............. *G07D 11/13* (2019.01); *B65H 29/00* (2013.01); *B65H 2402/32* (2013.01); *B65H 2601/11* (2013.01)

(58) Field of Classification Search
CPC .... G07D 11/13; B65H 29/00; B65H 2402/32; B65H 2601/11
See application file for complete search history.

(56) References Cited

U.S. PATENT DOCUMENTS

2010/0218707 A1* 9/2010 Billet ..................... G07D 11/18 232/1 D
2015/0307306 A1 10/2015 Kadota
2018/0040188 A1* 2/2018 Chou ..................... B65H 5/062
2018/0290849 A1 10/2018 Hosokawa et al.
(Continued)

FOREIGN PATENT DOCUMENTS

GB 2370905 * 7/2022
JP 2002-260057 * 9/2002
JP 2013235526 A 11/2013
(Continued)

OTHER PUBLICATIONS

ISR issued in PCT/J2019/042712, mailed Jan. 21, 2020.
(Continued)

*Primary Examiner* — Thomas A Morrison
(74) *Attorney, Agent, or Firm* — Greer Burns & Crain Ltd.

(57) ABSTRACT

A money depositing and dispensing machine 1 includes: a storage compartment 100 provided with a first front opening 101; a stowage compartment 200 disposed on a lower side of the storage compartment 100; a storage portion 12 stored in the storage compartment 100 and storing paper sheets; and a conveying unit 13 stored in the storage compartment 100 and for conveying the paper sheets stored in the storage portion 12 to the stowage compartment 200. The conveying unit 13 is configured to be slidable in a direction of the first front opening 101 provided in the storage compartment 100. The stowage compartment 200 stows the paper sheets conveyed by the conveying unit 13.

5 Claims, 9 Drawing Sheets

(56) References Cited

U.S. PATENT DOCUMENTS

| | | | | |
|---|---|---|---|---|
| 2019/0077619 | A1* | 3/2019 | Umezawa .......... | G03G 15/6502 |
| 2019/0304233 | A1 | 10/2019 | Nishida et al. | |

FOREIGN PATENT DOCUMENTS

| | | | |
|---|---|---|---|
| JP | 2014123222 | A | 7/2014 |
| JP | 2016222409 | A | 12/2016 |
| JP | 2018045618 | A | 3/2018 |
| WO | 2012056789 | A1 | 5/2012 |

OTHER PUBLICATIONS

Written Opinion of the ISA of PCT/J2019/042712, dated Jan. 21, 2020.
Office Action issued for JP 2021-553975 on Oct. 25, 2022.
EESR issued in European patent application No. 19 951 210.4, dated Jun. 12, 2023.

* cited by examiner

PAPER SHEET HANDLING APPARATUS

CROSS-REFERENCE TO RELATED APPLICATION

This application is continuation application of International Application PCT/JP2019/042712 filed on Oct. 31, 2019 and designated the U.S., the entire contents of which are incorporated herein by reference.

FIELD OF THE INVENTION

Embodiments discussed herein relate to a paper sheet handling apparatus.

BACKGROUND OF THE INVENTION

In a retail store or other stores, a paper sheet handling apparatus capable of receiving sales proceeds to be deposited is used for counting or collecting banknotes of the sales proceeds of the store in a register. When banknotes are inserted, the paper sheet handling apparatus stores the inserted banknotes in a storage compartment. The paper sheet handling apparatus conveys the banknotes stored in the storage compartment by a conveying unit and stows the banknotes in a stowage compartment. Since the paper sheets stowed in the stowage compartment are managed by a security transportation company or a financial institution of the transportation destination of the security transportation company, only the manager or other person of the security transportation company can access the paper sheets. For example, a technique has been proposed in which banknotes stored in a storage compartment are stowed in a stowage compartment (e.g., see JP 2013-235526 A).

BRIEF SUMMARY OF THE INVENTION

In view of the above conventional situation, an object related to one aspect of the present invention is to provide a paper sheet handling apparatus capable of easily maintaining a conveying unit for conveying paper sheets and maintaining the confidentiality of the paper sheets.

The paper sheet handling apparatus, which is one aspect of the present invention, includes: a storage compartment provided with an opening; a stowage compartment disposed on a lower side of the storage compartment; a storage portion stored in the storage compartment and storing paper sheets; and a conveying unit stored in the storage compartment and for conveying the paper sheets stored in the storage portion to the stowage compartment, in which the conveying unit is configured to be slidable in a direction of the opening provided in the storage compartment, and the stowage compartment stows the paper sheets conveyed by the conveying unit.

DESCRIPTION OF EMBODIMENTS

Since clogging (jamming) of banknotes may occur during conveyance of paper sheets stored in a storage compartment to a stowage compartment, a conveying unit is desired to have a configuration that facilitates maintenance. On the other hand, since it is necessary to reject access to the paper sheets stowed in the stowage compartment except for a manager or other person of a security transportation company, it is required to maintain confidentiality.

Figure 1:
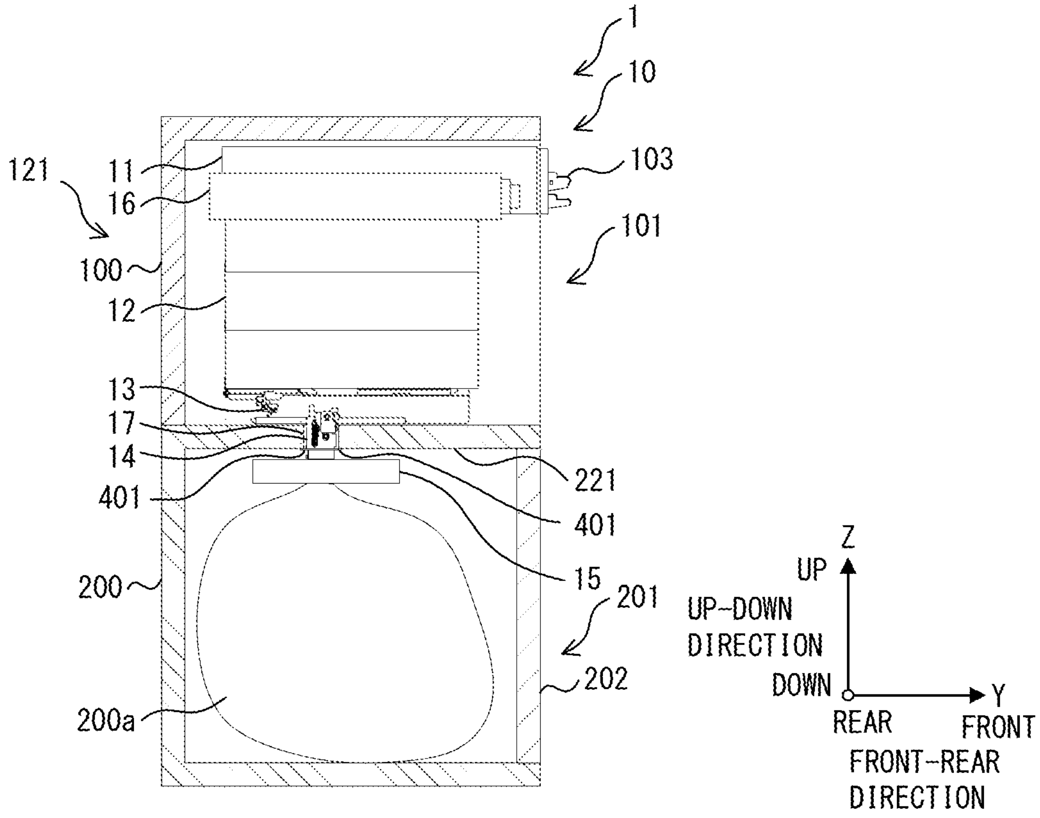
FIG. 1 is a diagram illustrating an example of a side view of a money depositing and dispensing machine in a present embodiment.
Figure 2:
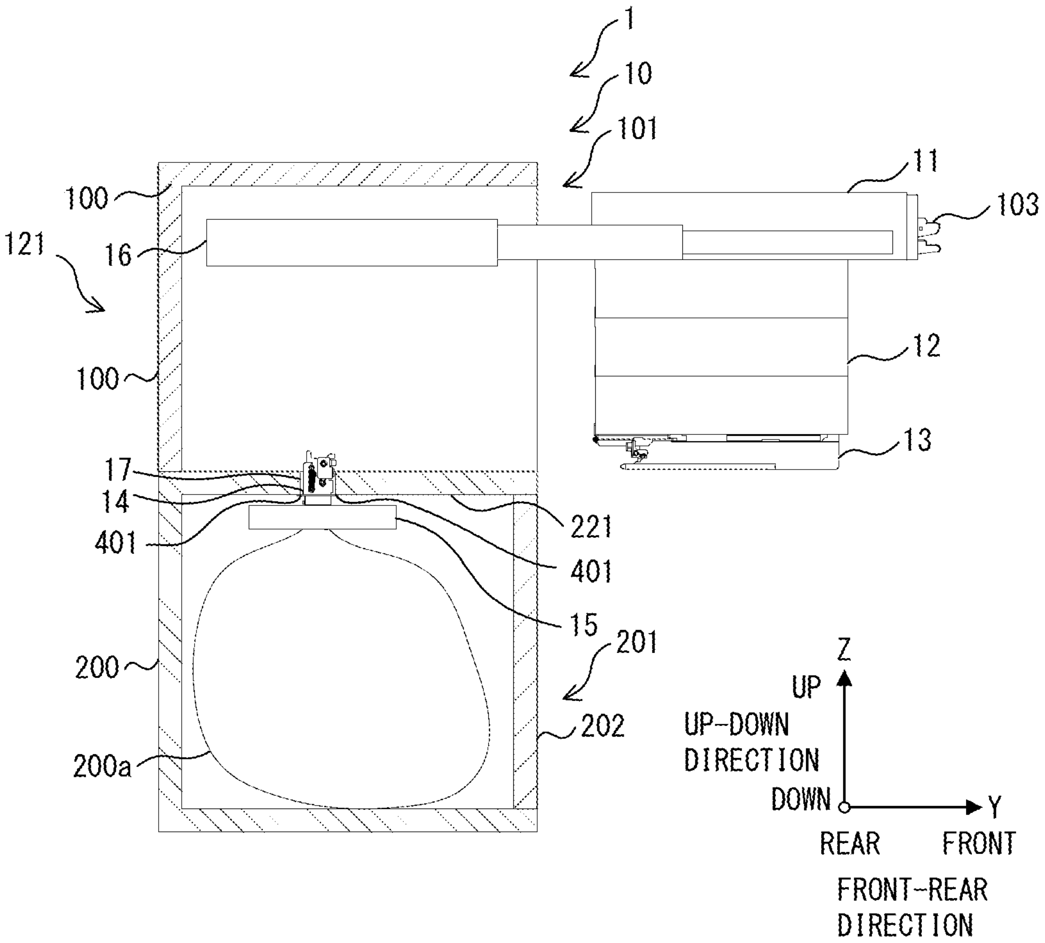
FIG. 2 is a diagram illustrating an example of a side view of the money depositing and dispensing machine in the present embodiment.

A paper sheet handling apparatus according to a present embodiment will be discussed below with reference to the drawings. In the present embodiment, although a money depositing and dispensing machine 1 is discussed as an example of the paper sheet handling apparatus, the paper sheet handling apparatus may be any other paper sheet handling apparatus such as an automated teller machine (ATM), a point of sales (POS) register, a self-register, a ticket vending machine, or a money changing machine as long as the apparatus handles paper sheets. FIGS. 1 and 2 are diagrams illustrating an example of a side view of the money depositing and dispensing machine 1 in the present embodiment.

As illustrated in FIGS. 1 and 2, the money depositing and dispensing machine 1 includes a housing 10, a drive unit 11, a storage portion 12, a conveying unit 13, a guide unit 14, a heat sealer 15, and a slide member 16.

The housing 10 includes a storage compartment 100 and a stowage compartment 200.

A first front opening 101 is provided in front of the money depositing and dispensing machine 1. The money depositing and dispensing machine 1 includes a first front door (not illustrated) for closing the first front opening 101 on its front left side.

A first rear opening 121 is provided at the rear of the money depositing and dispensing machine 1. The money depositing and dispensing machine 1 includes a first rear door (not illustrated) for closing the first rear opening 121 on its upper rear side.

The stowage compartment 200 is disposed on a lower side of the storage compartment 100, and the storage compartment 100 and the stowage compartment 200 are connected to each other in the up-down direction.

A second opening 201 is provided in front of the money depositing and dispensing machine 1. The money depositing and dispensing machine 1 includes a second door 202 for closing the second opening 201 on its front left side. The second opening 201 may be provided at the rear of the money depositing and dispensing machine 1.

Coordinate axes defining the relationship with other drawings are illustrated at the lower right of FIGS. 1 and 2. The Y direction is also referred to as a front-rear direction, and front and rear are as illustrated in the drawings. The Z direction is also referred to as an up-down direction, and up and down is as illustrated in the drawings.

Figure 3:
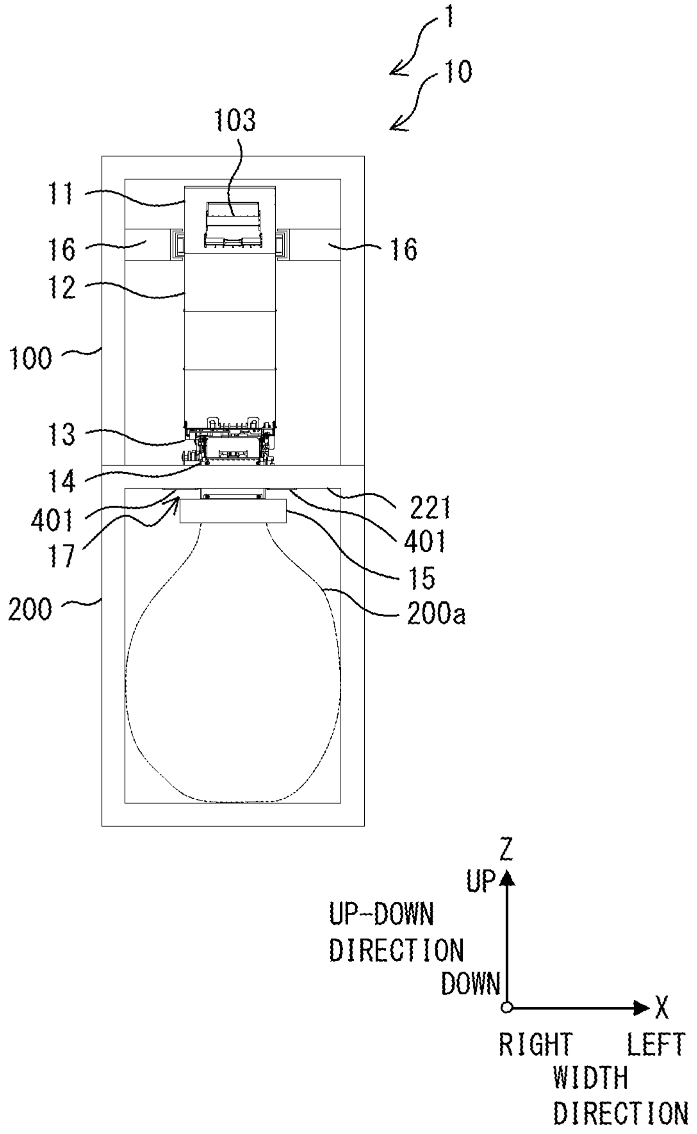
FIG. 3 is a diagram illustrating a front view of the money depositing and dispensing machine.

FIG. 3 is a diagram illustrating a front view of the money depositing and dispensing machine 1. In FIG. 3, the second door 202 is not illustrated. A coordinate axis defining the relationship with other drawings is illustrated at the lower right of FIG. 3. The X direction is also referred to as a width direction, and left and right are as illustrated in the drawing. The Z direction is also referred to as an up-down direction, and up and down is as illustrated in the drawing.

As illustrated in FIGS. 1 to 3, the drive unit 11, the storage portion 12, and the conveying unit 13 are stored in the storage compartment 100. The drive unit 11, the storage portion 12, and the conveying unit 13 are connected in the up-down direction in the order of the drive unit 11, the storage portion 12, and the conveying unit 13 from above.

As illustrated in FIG. 3, the slide members 16 disposed along the front-rear direction are disposed at both ends in the width direction of the drive unit 11. The drive unit 11 includes a drive source such as a motor, and transmits a drive force generated by the drive source to the storage portion 12 and the conveying unit 13. The slide member 16 is disposed in the drive unit 11, but is not limited thereto, and may be disposed in the storage portion 12 or the conveying unit 13.

Based on the drive force transmitted from the drive unit 11, the storage portion 12 conveys the paper sheets deposited from a money depositing and dispensing port 103 and stores the paper sheets for each face value of banknotes, for example. The paper sheets stored in the storage portion 12 are conveyed to the money depositing and dispensing port 103 based on the operation of the operator. The paper sheets stored in the storage portion 12 are conveyed to the stowage compartment 200 via the conveying unit 13 at an arbitrary timing. As the arbitrary timing, a timing operated based on the operation of the operator or a timing set in advance based on the operation of the operator can be adopted.

The conveying unit 13 conveys the paper sheets stored in the storage portion 12 to the stowage compartment 200 based on the drive force transmitted from the drive unit 11. A method of conveying the paper sheets to the stowage compartment 200 by the conveying unit 13 will be discussed in detail below.

A heat sealer 15 and a stowage bag **200*a* are stowed in the stowage compartment 200. The heat sealer 15 and the stowage bag 200*a* are connected in the up-down direction in the order of the heat sealer 15 and the stowage bag 200*a* from above. The heat sealer 15 thermally welds and seals the inlet of the stowage bag 200*a*** based on the operation of the operator.

In an upper plate 221 constituting the upper side surface of the stowage compartment 200, a through-hole 17 for passing the paper sheets is formed at a position corresponding to the center in the width direction of the money depositing and dispensing machine 1.

The guide unit 14 is inserted through the through-hole 17. The guide unit 14 includes a flange 401 extending in the width direction and the front-rear direction. The guide unit 14 inserted through the through-hole 17 is fixed to the upper plate 221 of the stowage compartment 200 by using the flange 401 positioned on the stowage compartment 200 side.

The guide unit 14 guides the paper sheets conveyed by the conveying unit 13 from the storage compartment 100 to the stowage compartment 200. The guide unit 14 is connected to the conveying unit 13 on the storage compartment 100 side in a state of being detachable in the front-rear direction, and is connected to the stowage bag **200*a* via the heat sealer 15 on the stowage compartment 200 side. The details of the guide unit 14 will be discussed below with reference to FIGS. 4 to 9**.

In the present embodiment, the stowage bag **200*a* is connected to the guide unit 14 via the heat sealer 15, but is not limited thereto, and the stowage bag 200*a* may be directly connected to the guide unit 14 without the heat sealer 15**.

The drive unit 11 is connected to inner side surfaces on both right and left sides of the storage compartment 100 via the slide member 16 attached to the drive unit 11 and slidable in the front-rear direction.

The drive unit 11, the storage portion 12, and the conveying unit 13, which are integrally connected, are attached to be slidable in the front-rear direction via the slide member 16 attached to the drive unit 11. In other words, the conveying unit 13 is configured to be slidable in the direction of the first front opening 101.

For example, when the money depositing and dispensing machine 1 is in operation, as illustrated in FIG. 1, the drive unit 11, the storage portion 12, and the conveying unit 13 are integrally slid to the rear of the money depositing and dispensing machine 1 via the slide member 16 and pushed into and stored in the storage compartment 100. At the time of maintenance of the money depositing and dispensing machine 1, as illustrated in FIG. 2, the drive unit 11, the storage portion 12, and the conveying unit 13 are integrally slid to the front of the money depositing and dispensing machine 1 via the slide member 16 and pulled out from the storage compartment 100.

The drive unit 11, the storage portion 12, and the conveying unit 13 are detachably connected to each other. Therefore, even in a case where clogging (jamming) of the paper sheets occurs in the conveying unit 13, the operator can pull out the drive unit 11, the storage portion 12, and the conveying unit 13 in the front direction, and then remove the conveying unit 13 to visually recognize and easily remove the clogged paper sheets.

Since the paper sheets stored in the storage compartment 100 are managed by a store, only the manager or other person of the store needs to be able to access the paper sheets. Therefore, the storage compartment 100 is locked so that a person other than the manager or other person of the store cannot open the first front door (not illustrated) of the storage compartment 100.

Since the paper sheets stowed in the stowage bag **200*a* of the stowage compartment 200 are managed by a security transportation company or a financial institution of the transportation destination of the security transportation company, only the managers or other person of the security transportation company needs to be able to access the paper sheets. Therefore, the stowage compartment 200 is locked so that a person other than the manager or other person of the security transportation company cannot open the second door 202. Therefore, since a person other than the manager or other person of the security transportation company cannot open the stowage compartment 200, the confidentiality in the stowage compartment 200 can be maintained even when the storage compartment 100 is opened due to the maintenance of the conveying unit 13**.

Figure 4:
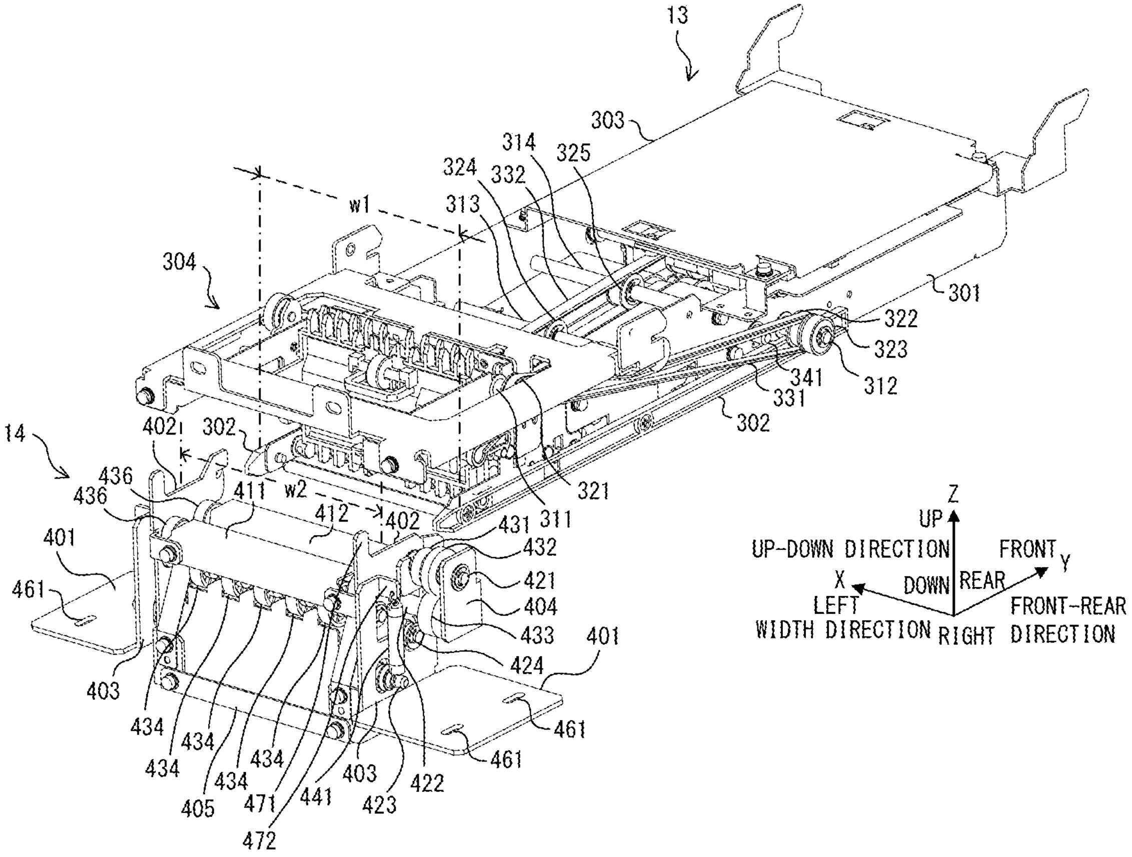
FIG. 4 is a perspective view illustrating a conveying unit and a guide unit.
Figure 5:
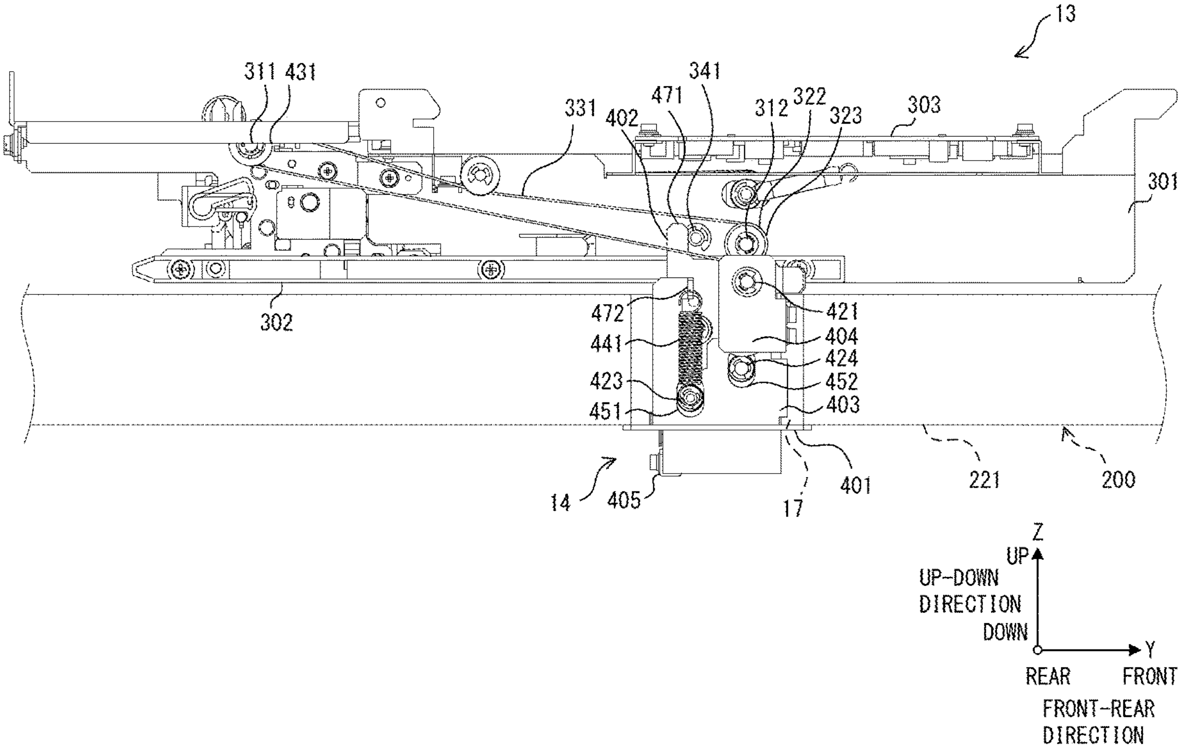
FIG. 5 is a side view illustrating the conveying unit and the guide unit.
Figure 6:
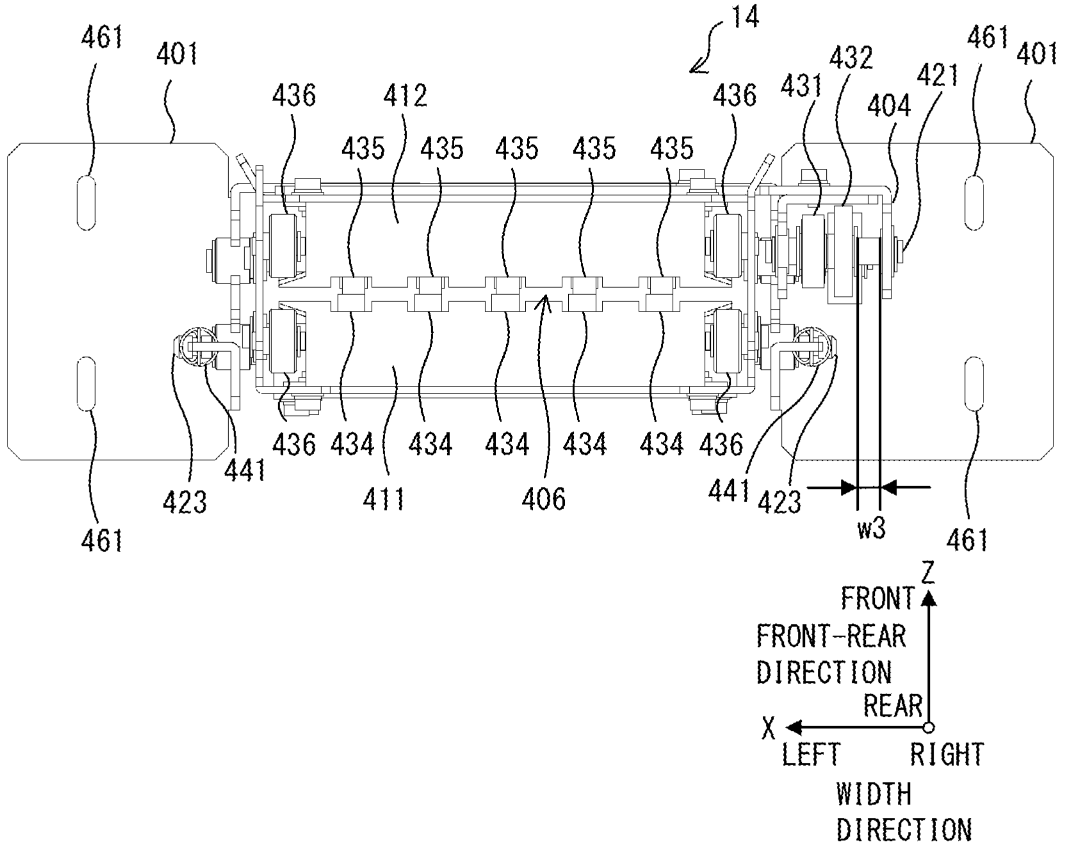
FIG. 6 is a plan view illustrating the guide unit.
Figure 7:
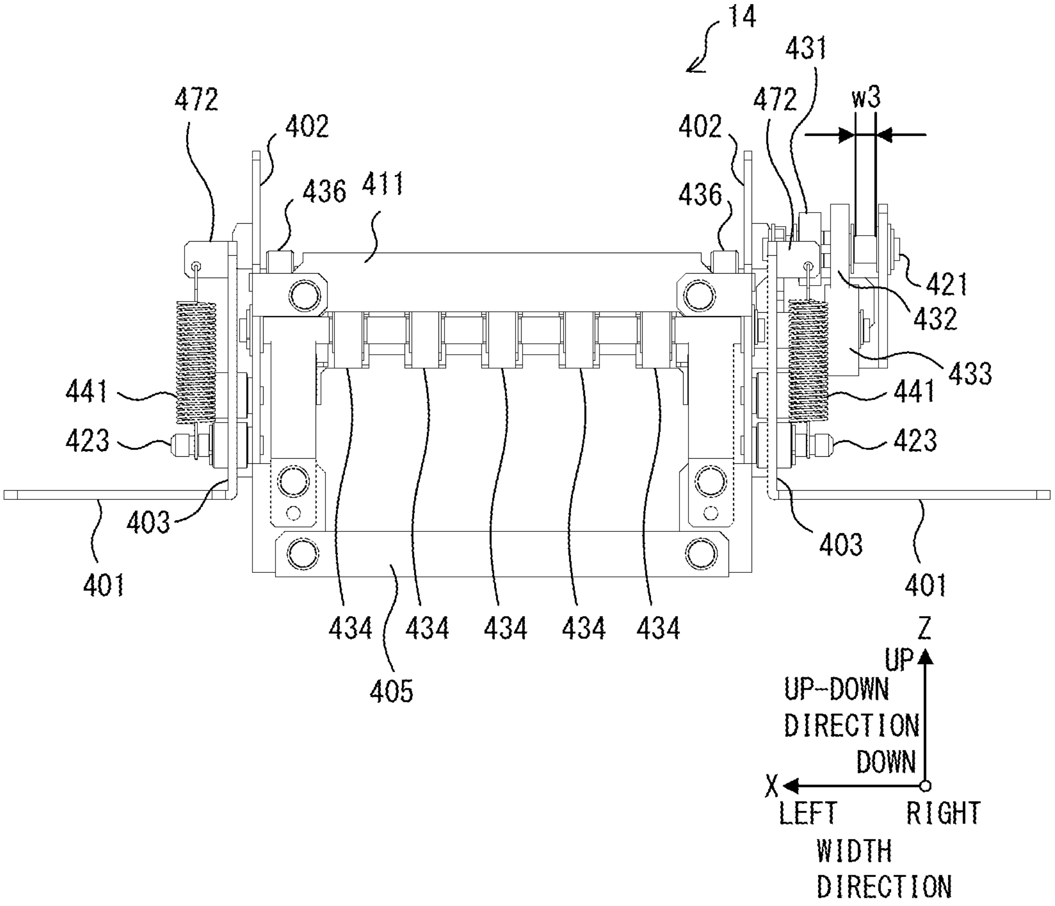
FIG. 7 is a rear view illustrating the guide unit.
Figure 8:
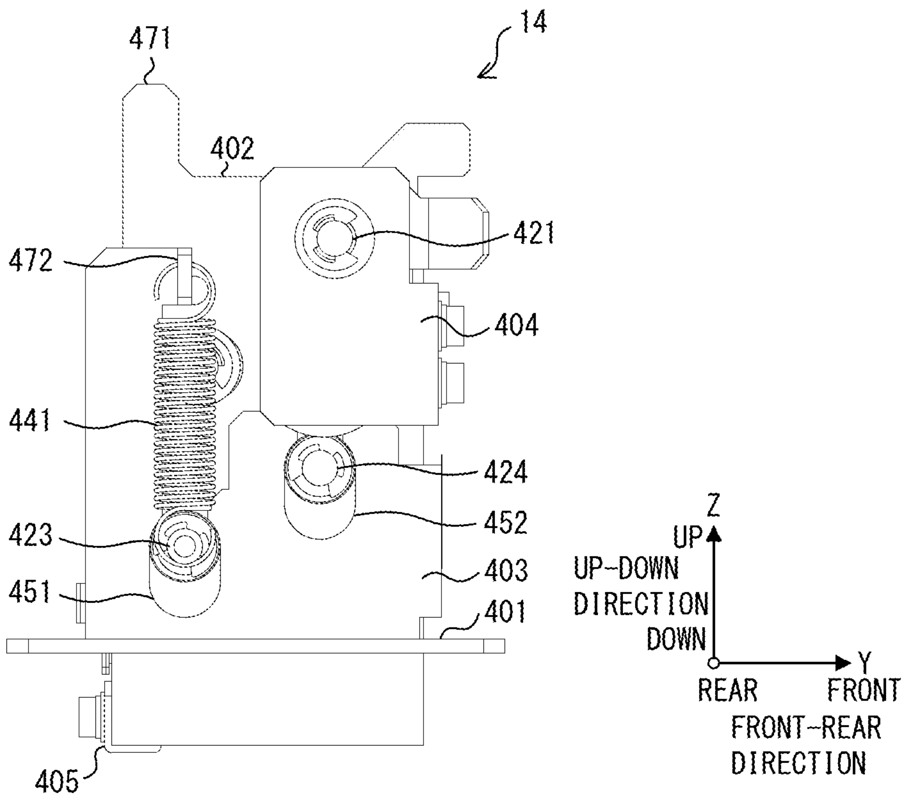
FIG. 8 is a side view illustrating the guide unit.
Figure 9:
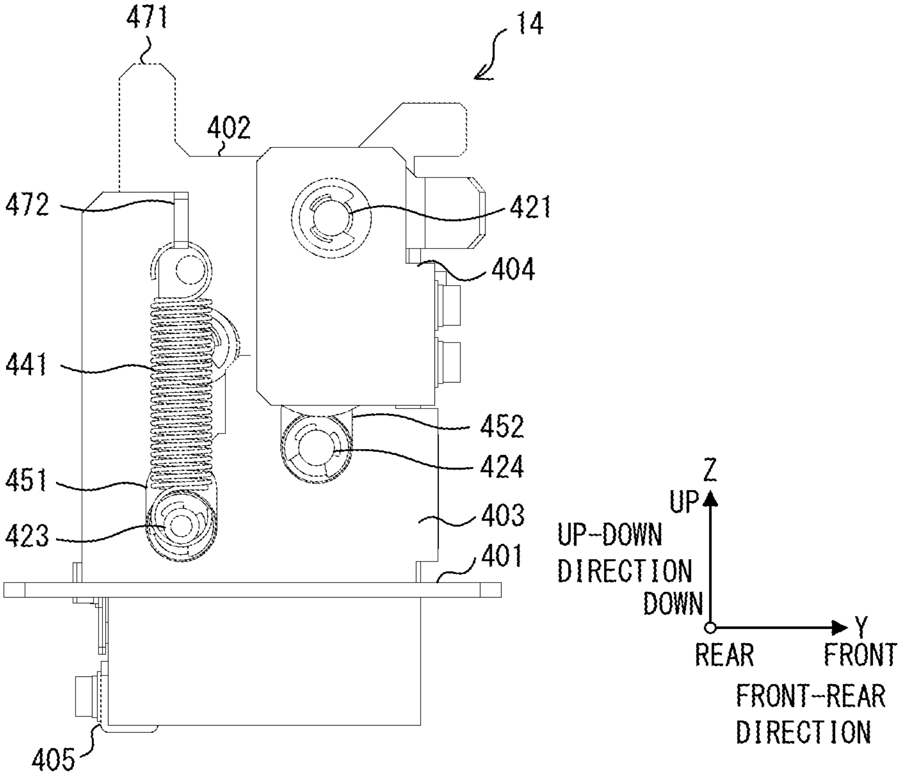
FIG. 9 is a side view illustrating the guide unit.

The conveying unit 13 and the guide unit 14 of the present embodiment will be discussed with reference to FIGS. 4 to 9. FIG. 4 is a perspective view illustrating the conveying unit 13 and the guide unit 14. FIG. 5 is a side view illustrating the conveying unit 13 and the guide unit 14. FIG. 6 is a plan view illustrating the guide unit 14. FIG. 7 is a rear view illustrating the guide unit 14. FIGS. 8 and 9 are side views illustrating the guide unit 14.

As illustrated in FIGS. 4 and 5, the conveying unit 13 includes a conveying unit housing 301, a pair of slide rails 302, a conveying unit lid 303, a first shaft 311 to a fourth shaft 314, a first pulley 321 to a fifth pulley 325, a first belt 331 to a second belt 332, and a protrusion 341. The conveying unit housing 301 is formed in a substantially rectangular parallelepiped shape. The pair of slide rails 302 is disposed at both ends in the width direction of the conveying unit housing 301 in an orientation extending along the front-rear direction.

The first shaft 311 to the fourth shaft 314 are rotatably pivotally supported at both ends in the width direction of the conveying unit housing 301 along the width direction of the conveying unit housing 301. The first shaft 311 is disposed in the vicinity of the rear of the conveying unit housing 301 in the front-rear direction, and the second shaft 312 is disposed in the vicinity of the center of the conveying unit housing 301 in the front-rear direction.

The first pulley 321 rotates about the first shaft 311, and the second pulley 322 and the third pulley rotate about the second shaft 312.

The first belt 331 is wound around the outer peripheries of the first pulley 321 and the second pulley 322, transmits the drive force of the first pulley 321 rotating based on the drive force transmitted from the drive unit 11 to the second pulley 322, and rotates the second shaft 312. The rotation of the second shaft 312 rotates the third pulley 323 pivotally supported by the second shaft 312.

The third shaft 313 is disposed in front of the first shaft 311 in the front-rear direction of the conveying unit housing 301, and the fourth shaft 314 is disposed between the third shaft 313 and the second shaft 312 in the front-rear direction of the conveying unit housing 301. The fourth pulley 324 rotates about the third shaft 313, and the fifth pulley 325 rotates about the fourth shaft 314.

The second belt 332 is wound around the outer peripheries of the fourth pulley 324 and the fifth pulley 325, and conveys the paper sheets stored in the storage portion 12 to the guide unit 14 based on the drive force transmitted from the drive unit 11.

The conveying unit lid 303 is configured to be freely openable and closable. Therefore, even if paper sheets are clogged (jammed) under the conveying unit lid 303, the operator can check the cause of the clogging and easily perform maintenance, by opening the conveying unit lid 303.

The protrusion 341 is formed to protrude to the right in the width direction of the conveying unit housing 301 in the vicinity of the second shaft 312 in the front-rear direction of the conveying unit housing 301. The protrusions 341 may be formed to protrude to the left or both sides in the width direction of the conveying unit housing 301.

As illustrated in FIGS. 4 to 7, the guide unit 14 includes a pair of flanges 401, a pair of upper housings 402, a pair of lower housings 403, a shaft housing 404, a support 405, a first guide portion 411, a second guide portion 412, a first guide shaft 421 to a fourth guide shaft 424, a first guide pulley 431 to a third guide pulley 433, a first roller 434, a second roller 435, a slide roller 436, and a spring 441. The pair of upper housings 402 and the pair of lower housings 403 are connected in the up-down direction in the order of the upper housing 402 and the lower housing 403 from above, at both ends in the width direction of the guide unit 14, respectively. The upper housing 402 and the lower housing 403 are attached so as to be movable in the up-down direction.

As illustrated in FIG. 4, the pair of upper housings 402 is fixed to a first guide portion 411 and a second guide portion 412, which have a semi-cylindrical shape and are disposed along the width direction of the guide unit 14. As illustrated in FIGS. 4 and 6, the first guide portion 411 and the second guide portion 412 are disposed substantially parallel to each other, and the paper sheets conveyed from the conveying unit 13 are inserted into a gap 406 formed between the first guide portion 411 and the second guide portion 412 and guided downward.

Each of the pair of lower housings 403 is fixed to a support 405 disposed along the width direction of the guide unit 14 and having an L-shaped cross section. The first guide shaft 421 to the fourth guide shaft 424 are rotatably pivotally supported at both ends in the width direction of the guide unit 14.

The first guide shaft 421 and the second guide shaft 422 are disposed adjacent to each other on the front side of the upper housing 402. The first guide pulley 431 and the second guide pulley 432 rotate about the first guide shaft 421, and the third guide pulley 433 rotates about the second guide shaft 422. The second guide pulley 432 and the third guide pulley 433 are rotatably engaged with each other, and the drive force transmitted to the second guide pulley 432 is transmitted to the third guide pulley 433.

When the conveying unit 13 is stored in the storage compartment 100 and the conveying unit 13 and the guide unit 14 are connected to each other, the first guide pulley 431 is formed to be engageable with the third pulley 323 pivotally supported by the second shaft 312 of the conveying unit 13. Therefore, the third pulley 323 transmits the drive force transmitted to the second shaft 312 to the second guide shaft 422 via the first guide pulley 431, the second guide pulley 432, and the third guide pulley 433.

As illustrated in FIGS. 4 and 6, five first rollers 434 and five second rollers 435 are disposed at predetermined intervals along the width direction of the guide unit 14 below the first guide portion 411 and the second guide portion 412, respectively.

In the present embodiment, since five first rollers 434 and five second rollers 435 are disposed, the gap 406 formed between the first guide portion 411 and the second guide portion 412 can be narrowed. Thus, it is possible to prevent unauthorized access to the stowage compartment 200 by inserting a hand or a jig into the gap 406, and to improve the confidentiality of the stowage compartment 200. The number of the first rollers 434 and the second rollers 435 is not limited to five, but may be a plurality of rollers, or may be one roller each. The first roller 434 and the second roller 435 are rotatably pivotally supported by the upper housing 402, respectively.

In a case where the first roller 434 and the second roller 435 are configured with a small number of rollers, it is preferable to increase the length of each roller in the width direction. Thus, the gap 406 formed between the first guide portion 411 and the second guide portion 412 can be narrowed. Thus, it is possible to prevent unauthorized access to the stowage compartment 200 by inserting a hand or a jig into the gap 406, and to improve the confidentiality of the stowage compartment 200.

The first roller 434 and the second roller 435 are configured to rotate such that the paper sheets inserted from the gap 406 by a one-way clutch are conveyed only in a direction from the upper side to the lower side. Thus, the paper sheets stowed in the stowage compartment 200 can be prevented from being pulled out from the gap 406 to improve the confidentiality of the stowage compartment 200.

As illustrated in FIG. 4, the width w1 between the outer sides of the pair of slide rails 302 of the conveying unit 13 is formed to have substantially the same size as the width w2 between the inner sides of the pair of upper housings 402 of the guide unit 14 or a size with a slight play. As illustrated in FIGS. 4 and 6, four slide rollers 436 are rotatably pivotally supported on the inside of the pair of upper housings 402.

When the conveying unit 13 is connected to the guide unit 14 by sliding in the front-rear direction, the pair of slide rails 302 formed in the conveying unit 13 is guided between the pair of upper housings 402 of the guide unit 14, and is configured to be slidable on the four slide rollers 436 in the direction of the first front opening 101. Thus, the deviation at the time of connecting the conveying unit 13 and the guide unit 14 can be suppressed to improve the efficiency of work during maintenance.

As illustrated in FIGS. 4 and 5, a protruding piece 471 protruding upward is formed on the upper side of the rear of the upper housing 402. The conveying unit 13 is stored in the storage compartment 100 from the first front opening 101 side, and the conveying unit 13 and the guide unit 14 are connected to each other. In this case, the front side of the protruding piece 471 of the guide unit 14 abuts on the rear side of the protrusion 341 formed in the conveying unit 13 to restrict sliding of the conveying unit 13 in the front-rear direction. Thus, when the conveying unit 13 and the guide unit 14 are connected to each other, the conveying unit and the guide unit are stopped at an appropriate position, so that the deviation at the time of connecting the conveying unit 13 and the guide unit 14 can be suppressed to improve the efficiency of work during maintenance.

The protruding piece 471 is formed on the upper side in the rear of the upper housing 402, but is not limited thereto, and may be formed, for example, on the upper side in the front of the upper housing 402. The conveying unit 13 is stored in the storage compartment 100 from the first rear opening 121 side, and the conveying unit 13 and the guide unit 14 are connected to each other. In this case, the front side of the protrusion 341 formed in the conveying unit 13 abuts on the rear side of the protruding piece 471 of the guide unit 14 to restrict sliding of the conveying unit 13 in the front-rear direction. Thus, only by changing the position of the protruding piece 471 constituting the upper housing 402, it is possible to cope with the configurations of both the type of the money depositing and dispensing machine 1 stored from the first front opening 101 and the type of the money depositing and dispensing machine 1 stored from the first rear opening 121, and it is possible to increase the variation of the types of money depositing and dispensing machines at low cost.

As illustrated in FIGS. 4 to 7, the pair of flanges 401 is formed to extend along the width direction at the lower ends of the pair of lower housings 403. Each flange 401 is formed in a rectangular shape in a plan view, and four mounting holes 461 are formed therein. As illustrated in FIGS. 1, 2, 4 and 5, the guide unit 14 is fixed to the through-hole 17 of the upper plate 221 of the stowage compartment 200 from the stowage compartment 200 side by screws, bolts, or others through the mounting hole 461 formed in the flange 401.

Thus, the through-hole 17 formed between the storage compartment 100 and the stowage compartment 200 can be closed by the guide unit 14. Since the guide unit 14 is fixed from the stowage compartment 200 side, unauthorized access to the stowage compartment 200 can be prevented by inserting a hand or a jig into the through-hole 17 from the storage compartment 100 side, to improve the confidentiality of the stowage compartment 200.

As illustrated in FIGS. 4 to 9, the third guide shaft 423 is disposed through a first guide hole 451 formed in the lower housing 403, below the rear side of the upper housing 402. The third guide shaft 423 is disposed through a second guide hole 452 formed in the lower housing 403, below the front side of the upper housing 402. Each of the first guide hole 451 and the second guide hole 452 is formed in an elongated hole shape extending in the up-down direction of the guide unit 14.

As illustrated in FIGS. 4, 5, and 7 to 9, a connecting piece 472 protruding in the width direction is formed on the upper side of the lower housing 403. The third guide shaft 423 and the connecting piece 472 are connected by the spring 441. The spring 441 pulls the upper housing 402 and the lower housing 403 together in the up-down direction.

Specifically, when the spring 441 is extended, as illustrated in FIG. 8, the third guide shaft 423 disposed in the upper housing 402 abuts on the upper side of the first guide hole 451 formed in the lower housing 403, and the fourth guide shaft 424 disposed in the upper housing 402 abuts on the upper side of the second guide hole 452 formed in the lower housing 403. Thus, the distance between the upper housing 402 and the lower housing 403 is widened.

When the spring 441 contracts, as illustrated in FIG. 9, the third guide shaft 423 disposed in the upper housing 402 abuts on the lower side of the first guide hole 451 formed in the lower housing 403, and the fourth guide shaft 424 disposed in the upper housing 402 abuts on the lower side of the second guide hole 452 formed in the lower housing 403. Thus, the distance between the upper housing 402 and the lower housing 403 is narrowed.

Thus, the distance between the upper housing 402 and the lower housing 403 constituting the guide unit 14 can be adjusted by the length in the up-down direction constituting the first guide hole 451 and the second guide hole 452. Thus, when the conveying unit 13 and the guide unit 14 are connected to each other, the conveying unit and the guide unit can be fixed to each other with an appropriate clearance, so that the deviation at the time of connecting the conveying unit 13 and the guide unit 14 can be suppressed to improve the efficiency of work during maintenance.

As illustrated in FIGS. 6 and 7, the first guide shaft 421 is rotatably pivotally supported by being sandwiched between the upper housing 402 and the shaft housing 404 that extends from the upper housing 402 in the width direction and that is connected to the upper housing. The upper housing 402 and the lower housing 403 are attached such that a relative position along the width direction is changeable with play of a distance w3.

Thus, the distance in the width direction between the upper housing 402 and the lower housing 403 constituting the guide unit 14 can be adjusted by the length of the distance w3. Thus, when the conveying unit 13 and the guide unit 14 are connected to each other, the conveying unit and the guide unit can be fixed to each other with an appropriate clearance, so that the deviation at the time of connecting the conveying unit 13 and the guide unit 14 can be suppressed to improve the efficiency of work during maintenance. Since the upper housing 402 and the lower housing 403 are connected to each other via the spring 441, the upper housing and the lower housing can be returned to an appropriate position, even when the upper housing and the lower housing are deviated in the width direction, to suppress the deviation at the time of connecting the conveying unit 13 and the guide unit 14. The spring 441 is disposed substantially vertically in the up-down direction, but is not limited thereto, and may be disposed obliquely in the width direction.

The present invention is not limited to the above embodiment as it is, but can be embodied by modifying the components without departing from the gist of the embodiment. Various inventions can be formed by appropriately combining of the plurality of components disclosed in the above embodiments. For example, all the components illustrated in the embodiments may be combined as appropriate. Further, components in different embodiments may be combined as appropriate. Various modifications and applications can be made without departing from the spirit of the invention.

The invention claimed is:

1. A paper sheet handling apparatus comprising:
a storage compartment provided with an opening;
a stowage compartment disposed on a lower side of the storage compartment;
a drive unit provided in the storage compartment and configured to include a motor;
a conveying unit stored in the storage compartment and configured to include a belt driven by the motor, wherein
the conveying unit conveys paper sheets stored in the storage compartment to the stowage compartment by using the belt,
the conveying unit is configured to be slidable in a direction of the opening provided in the storage compartment, and
the stowage compartment stows the paper sheets conveyed by the conveying unit, and
a guide unit configured to include one or a plurality of sets of rollers that guide the paper sheets conveyed by the conveying unit to the stowage compartment by using the one or the plurality of sets of rollers,
wherein the conveying unit is configured such that a slide rail disposed in an orientation extending along a front-rear direction of the conveying unit slides in a front-rear direction on a slide roller disposed in the guide unit, whereby the conveying unit is slidable in a direction of the opening,
wherein the guide unit comprises a flange, and
the guide unit is fixed from the stowage compartment side to a through-hole penetrating the storage compartment and the stowage compartment via the flange.

2. The paper sheet handling apparatus according to claim 1, wherein
the guide unit includes a protruding piece formed to restrict sliding of the conveying unit in a front-rear direction,
the conveying unit includes a protrusion disposed to abut on the protruding piece, and
the guide unit fixes the conveying unit at an arbitrary position by the protrusion abutting on the protruding piece.

3. The paper sheet handling apparatus according to claim 1, wherein
the guide unit further comprises an upper housing, a lower housing attached to the upper housing so as to be movable in an up-down direction, and a spring, and
the spring pulls the upper housing and the lower housing together in an up-down direction.

4. The paper sheet handling apparatus according to claim 2, wherein
the guide unit further comprises an upper housing, a lower housing attached to the upper housing so as to be movable in an up-down direction, and a spring, and
the spring pulls the upper housing and the lower housing together in an up-down direction.

5. The paper sheet handling apparatus according to claim 3, wherein
the upper housing and the lower housing are further attached such that a relative position along a width direction is changeable.

* * * * *